10

3,677,735
METHOD FOR THE CONTROL OF AQUATIC
PLANT LIFE
Sidney B. Richter, Chicago, and Alfred A. Levin, Skokie, Ill., assignors to Velsicol Chemical Corporation, Chicago, Ill.
No Drawing. Filed Aug. 20, 1969, Ser. No. 851,728
Int. Cl. A01n 9/00
U.S. Cl. 71—66       8 Claims

ABSTRACT OF THE DISCLOSURE

This invention discloses a method for the control of aquatic plant life which comprises contacting said plant life with a phytotoxic amount of a composition which comprises a compound of the formula

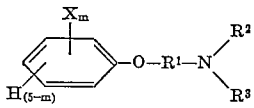

wherein $R^1$ is an alkylene group of from 2 to 4 carbon atoms; $R^2$ and $R^3$ are independently selected from the group consisting of hydrogen, alkyl and alkenyl; X is selected from the group consisting of alkyl, alkenyl, alkoxy, halogen, nitro and dialkylamino; and $m$ is an integer from 0 to 5.

---

This invention relates to the control of aquatic pests and in particular relates to the control of undesirable aquatic plant life.

Aquatic plants cause a variety of problems in lakes, ponds, streams, irrigation systems, drainage canals and in the cultivation of certain field crops. Thus, in the recreational uses of water, aquatic plants interfere with swimming and fishing, foul outboard motors and often impart undesirable flavors and odors to the water. In streams, irrigation systems and drainage canals aquatic plants interfere with the flow of water, effect increased evaporation and seepage and cause clogging of structures. While in the cultivation of such field crops as rice, aquatic plants compete for soil nutrients and sunlight resulting in considerable reduction of yields. While many mechanical methods for the control of undesirable aquatic plant life have been proposed and used in the past, such as dredging, underwater mowing, hand cleaning and chaining, only partial success has been obtained.

In recent years there has been an increased interest in the chemical control of aquatic plants and, as a result, a variety of compounds has been proposed to control their growth. Unfortunately, a compound which can control a wide spectrum of aquatic plant life without indiscriminately destroying all life forms has not been found.

In view of the aquatic weed problem and the limited development of chemical compounds which can be used to control such weeds, it is readily apparent that additional compounds and compositions useful for this purpose are urgently required.

Surprisingly, it has now been found that a compound of the formula

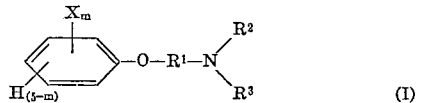   (I)

wherein $R^1$ is an alkylene group of from 2 to 4 carbon atoms; $R^2$ and $R^3$ are independently selected from the group consisting of hydrogen, alkyl and alkenyl; X is selected from the group consisting of alkyl, alkenyl, alkoxy, halogen, nitro and dialkylamino; and $m$ is an integer from 0 to 5, will effectively control aquatic plant life.

Thus, one embodiment of the present invention is a method of controlling aquatic plant life which comprises contacting said plant life with a phytotoxic amount of a compound of Formula I described above. A further embodiment of the present invention is a method of controlling aquatic weeds which comprises contacting said weeds with a phytotoxic amount of a composition comprising, as an essential active ingredient, a compound of Formula I. A still further embodiment of the present invention resides in a method of controlling algae which comprises contacting said algae with an algaecidally toxic amount of a composition comprising, as an essential active ingredient, a compound of Formula I.

Some of the active compounds of the present invention are known in the art. When not readily available these compounds can be prepared by reacting a phenoxyalkyl halide, having the desired substituents on the phenyl ring, with an excess of a primary or secondary alkyl or alkenyl amine. This reaction can be effected in an inert organic solvent such as methanol by refluxing the reaction mixture for a period of from about 1 to about 24 hours. After the reaction is completed the desired product can be recovered by evaporating the solvent and excess amine and then treating the residual amine salt with base to liberate the free amine. The product can then be used as such or can be further purified by conventional techniques such as recrystallization if the product is a solid or distillation or chromatography if the product is an oil.

The compounds of the present invention wherein both $R^2$ and $R^3$ are hydrogen can be prepared from a phenoxyalkyl nitrile having the desired substituents on the phenyl ring by reduction with lithium aluminum hydride. This reaction can be effected by slowly adding a solution of the nitrile in a suitable inert organic solvent such as ether to a slurry of lithium aluminum hydride in ether with vigorous stirring. After the addition is completed the reaction mixture can be heated at reflux for several hours to insure the completion of the reaction. The mixture can then be cooled and washed with water. The organic phase can then be separated and the solvent evaporated to yield the desired product. This product can then be used as such, or can be further purified by standard techniques in the art.

The intermediate phenoxyalkyl nitriles, when not readily available, can be prepared by reacting a phenol or substituted phenol having as a substituent the group defined as X in Formula I with a haloalkyl nitrile. This reaction can be carried out in an organic solvent such as methyl ethyl ketone by slowly adding a solution of the haloalkyl nitrile to the phenol in the presence of an acid acceptor. After the addition has been completed, the reaction mixture can be heated to ensure the completion of the reaction. The desired product can then be recovered upon filtration and evaporation of the solvent and can be further purified, when desired, by standard methods in the art.

The compounds of the present invention wherein at least one of $R^2$ and $R^3$ is an alkyl or alkenyl group can alternatively be prepared from those compounds of Formula I wherein both $R^2$ and $R^3$ are hydrogen by reaction with an alkyl or alkenyl halide.

The manner in which the active compounds of the present invention can be prepared readily is more specifically illustrated by the following examples.

EXAMPLE 1

Preparation of 2,6-dimethylphenoxyacetonitrile 2,6-dimethylphenol (12.2 grams; 0.1 mol), potassium carbonate (0.1 mol), potassium iodide (0.5 gram) and methyl ethyl ketone (35 ml.) were charged into a glass reaction vessel equipped with a mechanical stirrer, addition funnel and reflux condenser. A solution of chloroacetonitrile (8.3 grams; 0.11 mol) in methyl ethyl ketone (15 ml.) was added dropwise, with stirring, over a period of about 10 minutes. The reaction mixture was then heated at reflux for about one hour. After this time the mixture was filtered, stripped of methyl ethyl ketone under reduced pressure and the residue dissolved in ether and washed with aqueous sodium hydroxide. The washed ether solution was dried over magnesium sulfate, filtered and evaporated to give an oil. The oil was distilled under reduced pressure to yield the desired product 2,6-dimethylphenoxyacetonitrile having a boiling point of 88 to 92° C. at 0.5 mm. of Hg pressure.

EXAMPLE 2

Preparation of β-(2,6-dimethylphenoxy)ethylamine

A slurry of lithium aluminum hydride (7.5 grams; 0.2 mol) in ether (100 ml.) was charged into a glass reaction vessel equipped with a mechanical stirrer, reflux condenser and dropping funnel. The slurry was stirred vigorously and a solution of 2,6-dimethylphenoxyacetonitrile (22.4 grams; 0.14 mol) in ether (50 ml.) was added dropwise over a period of about 15 minutes. The reaction mixture was then heated at reflux, with continued stirring, for a period of about 2 hours. After this time the reaction mixture was cooled and wet ether (100 ml.) followed by ice water (400 ml.) was slowly added thereto. The mixture was then filtered and the ether layer was separated and washed with a saturated aqueous sodium chloride solution. The washed solution was dried over magnesium sulfate, filtered and stripped of ether to yield an oil. This oil was distilled to yield the desired product β-(2,6-dimethylphenoxy)ethylamine having a boiling point of 78 to 80° C. at 0.2 mm. of Hg pressure and a refractive index at 25° C. of 1.5193.

EXAMPLE 3

Preparation of 3,4-dichlorophenoxyacetonitrile 3,4-dichlorophenol (16.3 grams; 0.1 mol), potassium carbonate (0.1 mol), potassium iodide (0.5 gram) and methyl ethyl ketone (35 ml.) were charged into a glass reaction vessel equipped with a mechanical stirrer, addition funnel and reflux condenser. A solution of chloroacetonitrile (8.3 grams; 0.11 mol) and methyl ethyl ketone (15 ml.) was added dropwise with stirring over a period of about 10 minutes. The reaction mixture was then heated at reflux for about 1 hour. After this time the mixture was filtered, stripped of solvent under reduced pressure and the residue was dissolved in ether and washed with aqueous sodium hydroxide. The washed ether solution was dried over anhydrous magnesium sulfate, was filtered and evaporated resulting in oil. This oil solidified on adding to pentane. The solid was filtered, dried and crystallized from heptane to yield the desired product 3,4-dichlorophenoxyacetonitrile having a melting point of 55 to 57° C.

EXAMPLE 4

Preparation of β-(3,4-dichlorophenoxy)ethylamine

A slurry of lithium aluminum hydride (3.5 grams; 0.1 mol) in ether (100 ml.) was charged into a 1 liter three-necked glass reaction flask fitted with mechanical stirrer, reflux condenser and dropping funnel. The slurry was stirred vigorously and a solution of 3,4-dichlorophenoxyacetonitrile (15 grams; 0.074 mol) in ether (50 ml.) was added dropwise over a period of about 30 minutes. The mixture was then heated at reflux with stirring for a period of about 2 hours. The reaction mixture was then cooled and first wet ether (200 ml.) and then water (400 ml.) was slowly added with stirring. The mixture was filtered and the ether layer was separated and washed with two 500 ml. portions of saturated aqueous sodium chloride The washed solution was then dried over anhydrous magnesium sulfate, was filtered and stripped of ether to yield an orange colored oil. This oil was distilled under reduced pressure to yield the desired product β-(3,4-dichlorophenoxy)ethylamine having a boiling point of 132° C. at 0.3 mm. of Hg pressure and an index of refraction at 25° C. of 1.5657.

EXAMPLE 5

Preparation of β-(2,6-dimethylphenoxy)ethyl bromide

A slurry of 2,6-dimethylphenol (100 grams; 0.82 mol) and 1,2-dibromoethane (272 grams; 1.34 mol) in water (125 ml.) was charged into a 1 liter three-necked glass reaction flask equipped with mechanical stirrer, reflux condenser and dropping funnel. The mixture was heated to reflux and a solution of sodium hydroxide (54 grams; 1.35 mol) in water (500 ml.) was added to the mixture with stirring over a period of about 1 hour. The reaction mixture was then heated at reflux with stirring for an additional period of 4½ hours. After this time the mixture was cooled and extracted twice with ether. The ether extracts were combined, washed with water and dried over anhydrous magnesium sulfate. The dried solution was then filtered and the ether stripped resulting in an oil. This oil was washed with aqueous sodium hydroxide to remove any unreacted phenol and was redissolved in ether. The other solution was washed with water and dried over anhydrous magnesium sulfate. This dried solution was stripped of ether to yield an oil. The oil was distilled under reduced pressure to yield the desired product β-(2,6-dimethylphenoxy)ethyl bromide as a pale yellow oil having a boiling point of 78° C. at 0.5 mm. of Hg pressure and an index of refraction at 25° C. of 1.5354.

EXAMPLE 6

Preparation of N-methyl-β-(2,6-dimethylphenoxy)-ethylamine

A solution of methylamine (50 grams) in methanol (180 ml.) was prepared in a 500 ml. glass reaction flask equipped with mechanical stirrer, reflux condenser and addition funnel. A solution of β-(2,6-dimethylphenoxy)-ethyl bromide (22.9 grams; 0.1 mol) in methanol (20 ml.) was added dropwise to the amine solution with stirring over a period of about 30 minutes. The mixture was then heated at reflux with continued stirring for about 2 hours. After this time the reaction mixture was cooled and stripped of methanol under reduced pressure to yield a slushy solid. Aqueous sodium hydroxide was added to the solid to liberate a free amine and the amine was then taken up in ether. The ether solution was washed with water, dried over anhydrous magnesium sulfate and filtered. The filtered solution was stripped of ether to yield a yellow oil. This oil was distilled under reduced pressure to yield the desired product N-methyl-β-(2,6-dimethylphenoxy)ethylamine as a yellow oil having a boiling point of 78 to 80° C. at 0.1 mm. of Hg pressure and a refractive index at 28° C. of 1.5130.

EXAMPLE 7

Preparation of n-propyl-β-(2,6-dimethylphenoxy)-ethylamine

A solution of n-propylamine (95 grams) in methanol (150 ml.) was charged into a glass reaction vessel equipped with mechanical stirrer, reflux condenser and addition funnel. The solution was stirred vigorously and β-(2,6-dimethylphenoxy)ethyl bromide (45 grams; 0.2 mol) dissolved in methanol (20 ml.) was added dropwise over a period of about 30 minutes. After the addition was completed the mixture was heated at reflux with stirring for an additional 4 hours. After this time the reaction mixture was stripped of methanol under reduced pressure to yield an oil. This oil was treated with an aqueous sodium hydroxide solution to liberate the free amine which was then dissolved in ether. The ether solution was washed with water, dried over anhydrous magnesium sulfate and filtered. The filtered solution was then stripped of ether to yield an oil. This oil was distilled under reduced pressure to yield the desired product n-propyl-β-(2,6-dimethylphenoxy)ethylamine as a yellow oil having a boiling point of 97 to 100° C. at 1 mm. of Hg pressure and a refractive index at 25° C. of 1.5029.

EXAMPLE 8

Preparation of β-(3,4-dichlorophenoxy)ethyl bromide

A mixture of 3,4-dichlorophenol (50 grams; 0.031 mol) 1,2-dibromoethane (94.2 grams; 0.5 mol) and water (125 ml.) were charged into a glass reaction vessel equipped with mechanical stirrer, reflux condenser and addition funnel. The mixture was heated to reflux with stirring and the solution of sodium hydroxide (20.1 grams; 0.5 mol) in water (200 ml.) was slowly added over a period of about 1 hour. After the addition was completed, heating and stirring were continued for an additional 4 hours. After this time the mixture was cooled, was extracted with ether and the ether extract washed with water and dried over anhydrous magnesium sulfate. The dried solution was filtered and stripped of ether to yield an oil. The oil was washed with aqueous sodium hydroxide to remove any unreacted phenol and was dissolved in ether. The ether solution was dried over anhydrous magnesium sulfate, filtered and stripped of solvent to yield an oil. This oil was distilled under reduced pressure to yield the desired product β-(3,4-dichlorophenoxy)ethylbromide as a yellow oil having a boiling point of 112 to 114° C. at 0.1 mm. of Hg pressure and a refractive index at 25° C. of 1.5795.

EXAMPLE 9

Preparation of N-methyl-β-(3,4-dichlorophenoxy)-ethylamine

A solution of methylamine (50 grams) in methanol (180 ml.) was prepared in a glass reaction flask equipped with mechanical stirrer, reflux condenser and addition funnel. β-(3,4-dichlorophenoxy)ethyl bromide (23.5 grams; 0.087 mol) dissolved in methanol (20 ml.) was added thereto with stirring over a period of about 30 minutes. After the addition was completed the mixture was heated at reflux for about 2 hours. After this time the reaction mixture was stripped of solvent under reduced pressure to yield a yellow solid. This solid was treated with aqueous sodium hydroxide to liberate the free amine which was dissolved in ether. The ether solution was washed with water and dried over anhydrous magnesium sulfate. The dried solution was then filtered and stripped of ether to yield an oil. This oil was distilled under reduced pressure to yield the desired product N-methyl-β-(3,4-dichlorophenoxy)ethylamine as a yellow oil having a boiling point of 110 to 112° C. at 0.1 mm. of Hg pressure and having a refractive index at 25° C. of 1.5493.

Exemplary additional compounds which can be used in the compositions and methods of the present invention are:

β-(3,4-dichlorophenoxy)ethylamine
N-methyl-β-(2,4-dichlorophenoxy)ethylamine
N,N-dimethyl-β-(3,4-dichlorophenoxy)ethylamine
N-ethyl-β-(3,4-dichlorophenoxy)ethylamine
N-isopropyl-β-(3,4-dichlorophenoxy)ethylamine
N-butyl-β-(2-methyl-4-chlorophenoxy)ethylamine
N-decyl-β-(2,6-dichlorophenoxy)ethylamine
β-(4-cyanophenoxy)ethylamine
β-(4-chlorophenoxy)ethylamine
β-(3,4-dibromophenoxy)ethylamine
β-(4-trifluoromethylphenoxy)ethylamine
β-(3-allylphenoxy)ethylamine
N-methyl-β-(2-methoxy-4-chlorophenoxy)ethylamine
N,N-diethyl-β-(3-nitrophenoxy)ethylamine
N-isopropyl-β-(2-dimethylaminophenoxy)ethylamine
N,N-di-n-propyl-β-(3,4-dichlorophenoxy)ethylamine
γ-(3,4-dichlorophenoxy)propylamine
N-methyl-γ-(3,4-dichlorophenoxy)propylamine
N-ethyl-γ-(2,6-dimethylphenoxy)propylamine
δ-(2,4-dichlorophenoxy)butylamine
N,N-dimethyl-δ-(2-methyl-4-chlorophenoxy)butylamine, and the like.

For practical use in controlling aquatic plant life the active compounds of this invention can be used as such or can be formulated into compositions which comprise an inert carrier or a diluent in a toxic amount of such a compound. Such compositions which can also be called formulations often enable the active compound to be applied conveniently to the site of the aquatic plant life infestation in any desired quantity. These compositions can be liquids such as solutions or emulsifiable concentrates, or solids such as granules, wettable powders or pellets.

Solutions of the active compounds of this invention can usually be prepared by dissolving the compound in a common organic solvent such as kerosene, xylene, acetone, methanol, or the like.

Emulsifiable concentrates comprise an active compound according to this invention, a solvent and an emulsifier. The solvent employed in an emulsifiable concentrate is not critical providing it dissolves the active compound. In some instances, however, it can be advantageous to use a solvent which itself exhibits some activity for the control of aquatic plant life. Aromatic solvents derived from coal tar and petroleum are often of this nature. The emulsifiers most commonly used in these formulations are nonionic or mixtures of nonionic with anionic surface-active agents.

Solid formulations such as granules can be prepared by impregnating the active compound, usually dissolved in a suitable solvent, onto and into granulated carriers such as the attapulgites or the vermiculites, usually of a particle size range of from about 0.3 to about 5 mm. For example, a typical granular formulation can be prepared by charging adsorbent granules into a tumbler-blender and then applying a solution of the active compound in the form of a fine spray or mist until the desired concentration of the active ingredient is obtained.

Wettable powders consist of admixtures of finely divided powders of an inert carrier such as talc, clay, silica, pyrophyllite, and the like, in an active compound to which wetting agents have been added. Such formulations are usually prepared by grinding and blending the ingredients until a free-flowing dust of the desired particle size is obtained.

Pelletized formulations consist of an active compound, a solid inert carrier and a binding agent. Suitable binding agents are hardenable materials such as vinyl chloride-vinyl acetate copolymers, hydrocarbon resins, alkyd resins, natural and synthetic drying oils, rosin esters, varnishes, phenolic resins, and any of the film forming polymeric materials commonly used in the coatings industry. Pellets are usually prepared by mixing the active compound, the inert carrier and the binding agent, which in most instances is in a solution form, until a paste results. This paste can then be extruded into pellets of any desired size or shape and can then be hardened upon evaporation of the solvent, upon heat curing of the polymeric materials or other methods as required. Such pelletized formulations often have the advantage of releasing the active ingredients at a controlled rate resulting in better and longer control of aquatic plant life.

The concentration of the active compounds of this invention in the various formulations will vary greatly with the type of formulation and the purpose for which it is designed. But generally the formulations will contain from about 0.05 to about 95 percent by weight of the active compound of this invention.

The compositions of this invention can be applied to the site of the aquatic plant infestation in a manner recognized by the art. One method for the control of aquatic plant life comprises contacting said plant life with a toxic amount of a compound of this invention or a composition which comprises a carrier and an active compound of this invention. Anther method for the control of aquatic plant life comprises contacting the water in which said plant life grows with a toxic amount of a compound or composition heretofore described. Yet another method of controlling aquatic plant life comprises treating the soil in which aquatic weeds grow with an above described composition.

Undesirable aquatic plant life usually consists of algae and aquatic weeds. Such plants have no economic value and interfere with the utilization of the waters in which they grow.

While there is a vast number of known algae, the more common ones can be classified into four major groups: the blue-green algae which include such forms as Oscillatoria, Anacystis and Desmonema; the green algae such as Chlorella, Pediastum and Spirogyra; the diatoms such as Cyclotella and Navicula; and the pigmented flagellates as Euglena and Synura.

Aquatic weeds are undesirable plants which normally start in water and grow at least part of their life cycle in water. These weeds can be classified into submerged weeds, emergent weeds, marginal weeds and floating weeds. Among the submerged weeds are those which primarily spend their life cycle below the surface of the water such as fanwort, water-starwort, coontail, needlerush, spikerush, elodea, dense waterweed, Western waterweed, waterstargrass, St. Johnswort, waterprimrose, watermilfoil, parrot's feather, naiad, pondweed, wrinkled-leaf pondweed, fine-leaved pondweed, leafy pondweed, American pondweed, sago pondweed, Richardson's pondweed, bladderworts, eelgrass, horned pondweed, whitestem pondweed, giant pondweed, water buttercup, ducksalad and waterplantain. Among the emergent weeds or those aquatic weeds which send stems and leaves above the water surface are watershield, watercress, spatterdock, waterlilies, water parsley, arrow-arum, waterlettuce, white water crowfoot and waterchestnut. Marginal weeds are those aqueatic plants which grow at the edge of lakes, ponds, streams and canals, or in relatively shallow waters. Among this type are cattails, sweetflag, alders, Mexican weed, Oregon sugargrass, sedge, waterwillow, saltgrass, horsetail, rosemallow, pennwort, rushes, cutgrass lotus, goldenclub, maidencane, paragrass, knotgrass, reedgrass, waterpepper, pickerelweed, marshmarigold, arrowhead, bulrushes, saltgrass, woolgrass, burreed, cordgrass, gooseweed, salt cedar and giant cutgrass. Examples of floating weeds are water-hyacinth, waterfern, alligatorweed, duckweed and watermeals.

The quantity of active compounds required to control aquatic weeds is dependent on a variety of factors such as the hardiness of the particular weed species, methods of application, weather, depth and flow of water, density of phytoplankton, temperature, water hardness, pH, and the like. Generally a rate of from 0.05 to about 50 pounds of active compound per acre of a concentration of about 0.1 to 100 parts per million in the water in which the weeds are growing can be required for good control of aquatic weeds. For example, to control submerged plants in static water, a concentration of only about 5 p.p.m. or less can be sufficient. However, to control the same plants in rapidly moving water, a concentration of up to 100 p.p.m. may be required.

The active compounds of the present invention are also useful when combined with other aquatic herbicides in the compositions heretofore described. These other materials can comprise from about 5 to about 95 percent by weight of the active ingredients in the compositions. Use of combinations of these other aquatic herbicides with the active compounds of this invention often provides compositions which are more effective than separate compositions of the individual compounds.

These other aquatic herbicides with which the active compounds of this invention can be combined include such compounds as copper sulfate, sodium arsenite, acroflavin, acrolein, alum, amitrol, ammonium sulfamate, sodium chlorate, atrazine, benzene hexachloride, CDEA, chlorinated benzene, 2,4-D, dalapon, dichlone, diquat, diuron, DNBP, DNC, DNCHP, 2,3-DNQ, dichloropropionic acid, erbon, fenac, fenuron, ferbam, hexachloroacetone, IPC, potassium permanganate, MCPA, maleic hydrazide, monuron, colloidal silver, polychlorobenzoic acid, neburon, trichloroacetic acid, pentachlorophenol, pyridylmercuric acetate, 2,3-dichloronaphthaquinone, silvex, simazine, 2,4,5-T, TBA, trichloroacetic acid, trichlorobenzene, trichloroethylene, potassium azide, ziram, and the like.

Such compounds can also be used in the form of their salts, esters, amides and other derivatives whenever applicable to the particular parent compound.

The effectiveness of the compounds of the present invention in controlling aquatic plant life was demonstrated in an experiment wherein the algaecidal activity was determined at various concentrations of active compound. This experiment was carried out by placing various algal species into separate paper cups containing 150 mg. of fertilizer and containing the test material, formulated as an aqueous dispersion of an acetone solution, at the indicated concentrations. The cups were then placed in a greenhouse where they were maintained under controlled temperature and lighting conditions for a period of seven days. After this time the growth inhibition of the algae was determined and rated on a percent basis as compared to controls. The results of this experiment are as follows:

TABLE 1

| Test compound | Concentration in p.p.m. | Percent control | | |
| --- | --- | --- | --- | --- |
| | | Hydrodictyon Spp. | Hormidium Spp. | Spirogyra Spp. |
| Product of Example 6 | 11.125 | 100 | 100 | |
| | 5.56 | 100 | 98 | 99 |
| | 2.78 | 98 | 95 | 95 |
| | 1.39 | 90 | 65 | 40 |
| Product of Example 9 | 5.56 | 100 | 100 | 96 |
| | 2.78 | 100 | 100 | 96 |
| | 1.39 | 100 | 100 | 90 |
| | 0.695 | 100 | 98 | 90 |

The activity of the compounds of the present invention was further demonstrated in an experiment carried out for the control of Sago Pondweed (*Potamogeton pectinatus*) and Elodea (*Elodea canadensis*). In this experiment the aquatic plants were growing in small plastic pots submerged under eight inches of water. Twenty-one pots each containing one plant were submersed in an 18 inch diameter container. The water was then treated with the test compound formulated as an aqueous dispersion of an acetone solution and held under controlled temperature and lighting conditions for a period of about 21 days. The condition of the aquatic plants was evaluated 8, 15 and 21 days after treatment and rated on a scale of from 0 to 10 as follows: 0=no injury, 1,2=slight injury, 3,4=moderate injury, 5,6=moderately severe injury, 7,8,9=severe injury and 10=death. The results of this experiment are shown in Table II.

TABLE II

| Test compound | Concentration in p.p.m. | Injury rating | | | | | |
| --- | --- | --- | --- | --- | --- | --- | --- |
| | | Elodea after— | | | Sago pondweed after— | | |
| | | 8 days | 15 days | 21 days | 8 days | 15 days | 21 days |
| Product of Example 9 | 10 | 10 | 10 | 10 | 9 | 9 | 9 |
| | 5 | 10 | 10 | 10 | 9 | 9 | 9 |
| | 2.5 | 8 | 9 | 10 | 9 | 9 | 9 |

We claim:
1. A method of controlling aquatic plant life which comprises contacting said plant life with a phytotoxic amount of a compound of the formula

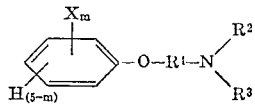

wherein $R^1$ is an alkylene group of from 2 to 4 carbon atoms; $R^2$ and $R^3$ are independently selected from the group consisting of hydrogen and alkyl; X is selected from the group consisting of alkyl, alkenyl, alkoxy, halogen, nitro and dialkylamino; and $m$ is an integer from 0 to 5.

2. The method of claim 1 wherein the compound is $\beta$-(3,4-dichlorophenoxy)ethylamine.

3. The method of claim 1 wherein the compound is $\beta$-(2,6-dimethylphenoxy)ethylamine.

4. The method of claim 1 wherein the compound is N-methyl-$\beta$-(3,4-dichlorophenoxy)ethylamine.

5. The method of claim 1 wherein the compound is N-methyl-$\beta$-(2,6-dimethylphenoxy)ethylamine.

6. The method of claim 1 wherein the compound is N-methyl-$\beta$-(2,4-dichlorophenoxy)ethylamine.

7. The method of claim 1 wherein the aquatic plant life consists of algae.

8. The method of claim 1 wherein the aquatic plant life consists of aquatic weeds.

References Cited
UNITED STATES PATENTS
3,032,406   5/1962   D'Amico et al. _____ 71—121

JAMES O. THOMAS, JR., Primary Examiner

U.S. Cl. X.R.

71—67